United States Patent

[11] 3,625,378

| [72] | Inventor | Frank H. Attiz<br>209 Emerald Hill Drive, Oxon Hill, Md. 20022 |
|---|---|---|
| [21] | Appl. No. | 49,701 |
| [22] | Filed | June 25, 1970 |
| [45] | Patented | Dec. 7, 1971 |

[54] HIGH-VACUUM MANIPULATING TOOL
2 Claims, 1 Drawing Fig.

[52] U.S. Cl. .................................................. 214/1 CM, 214/19
[51] Int. Cl. ..................................................... B25j 1/10
[50] Field of Search ........................................ 214/1 CM; 294/16, 19

[56] References Cited
UNITED STATES PATENTS

| 186,609 | 1/1877 | Palmer ..................... | 294/19 R X |
| 3,426,202 | 2/1969 | Chesley ..................... | 214/1 CM |

FOREIGN PATENTS

| 117,241 | 2/1959 | U.S.S.R. ..................... | 214/1 CM |
| 190,089 | 6/1964 | Sweden ..................... | 294/19 |

Primary Examiner—Albert J. Makay
Assistant Examiner—George F. Abraham
Attorneys—R. S. Sciascia, Arthur L. Branning, J. G. Murray and M. L. Crane ABSTRACT: This disclosure is directed to a simple manipulator which permits handling of, and performance of work on, small objects within a vacuum chamber. In one embodiment, it is provided with pincers or tweezers having normally open tines which are closed on an object by a movable rod that extends into the vacuum chamber through a vacuumtight opening. Two flexible metal bellows are employed in the vacuum seal: the smaller one allows rod motion to open and close the pincers; the larger bellows allows axial and lateral translational motion of the pincers and the object being held. The device is provided with springs along the outer surface of the larger bellows to prevent atmospheric pressure from expanding the bellows to its maximum length. Therefore, operation of the manipulator from the outside permits handling of objects within the evacuated chamber.

PATENTED DEC 7 1971 3,625,378
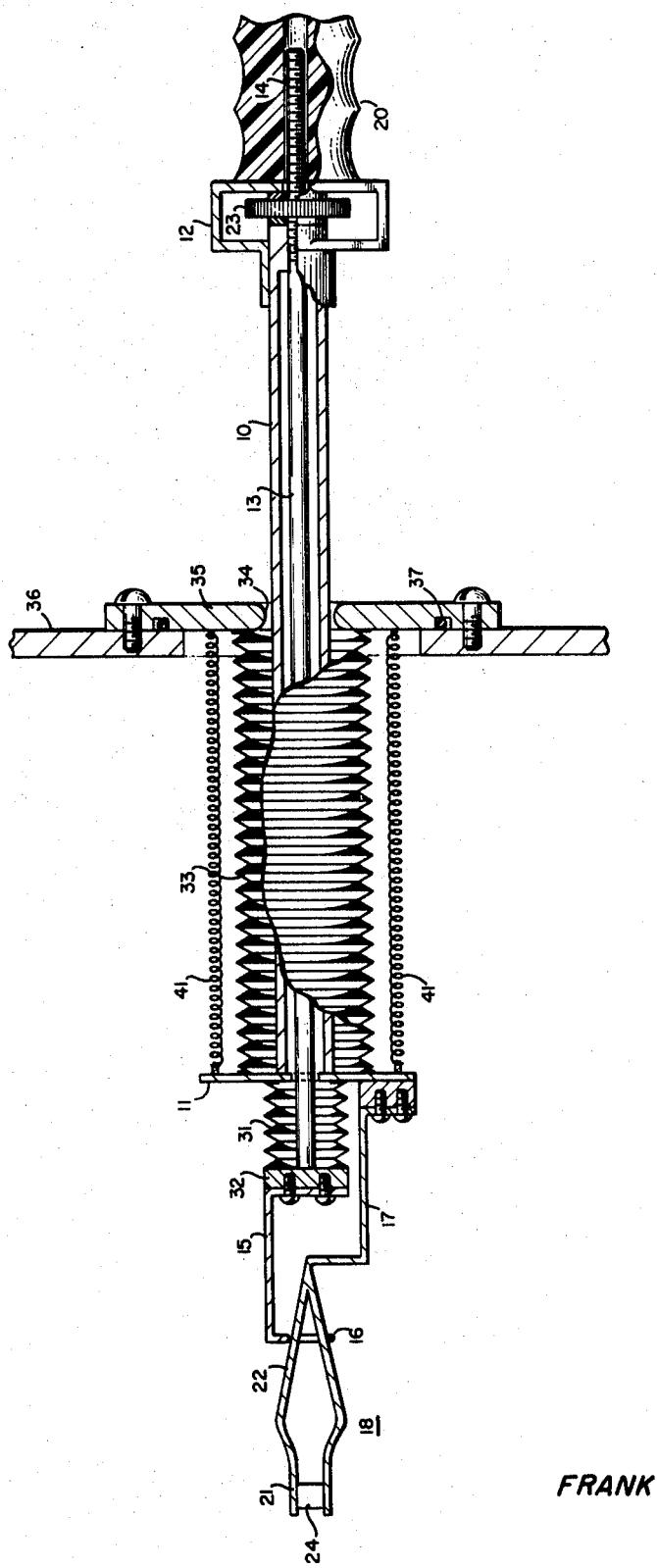
INVENTOR
FRANK H. ATTIX
BY
*[signature]* ATTORNEY

HIGH-VACUUM MANIPULATING TOOL

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Heretofore, mechanical devices have been used for remote manipulation of samples in large areas such as radiation-shielded rooms. Such "master-slave manipulators" are not vacuumtight, are not heatable for outgassing, and are too large and complex for use in small vacuum chambers. Sample manipulators suitable for small vacuum chambers have been used in the prior art, but they are more complex and less versatile than the device described in this disclosure. No prior art manipulator for vacuum chambers has been capable of picking up a sample at an arbitrary location, transporting it directly and quickly to another arbitrary location, and releasing it there.

SUMMARY OF THE INVENTION

This invention is directed to a simple hand-operated device which allows one to pickup, transport, place in position and release small samples, and permits the cutting of various items, the cleaving of crystals, the breaking of glass ampuls and performing various other desired tasks within an evacuated chamber. The device makes use of a control rod inside a rigid tube, in combination with two flexible metal bellows to allow motion while preventing leakage of air into the vacuum chamber. One of the bellows allows longitudinal motion of the control rod within the rigid tube, caused by thumbscrew rotation, which operates the pincers or other tool. The other bellows allows translational motion of the pincers and thus any object being held thereby. This translational motion can be lateral as well as longitudinal, or a simultaneous combination of both types of motion. During transport a sample is positively held in the pincers with a constant clamping pressure determined by the thumbscrew setting.

STATEMENT OF THE OBJECTS

It is therefore an object of the present invention to provide a simple device which permits one to perform work within a vacuum chamber from the outside thereof.

Another object is to provide a simple hand-operated device for performing desired work within a vacuum chamber without loss of vacuum through actual or virtual leaks.

Yet another object is to provide a directly hand-operated device which permits lateral as well as axial translational motion, and simultaneous combinations of these types of motion, of the working tool.

Yet another object is to provide a hand-operated device for picking up a sample, at an arbitrary location in a vacuum chamber, moving the sample directly and quickly to a second arbitrary location, and releasing the sample.

Yet another object is to provide a hand-operated device for performing work within a vacuum chamber wherein the apparatus will withstand high outgassing temperatures along with the evacuated chamber.

Other and more specific objects of the invention will become apparent upon a careful consideration of the following detailed description when considered with the accompanying drawing.

BRIEF DESCRIPTION OF THE DRAWING

The drawing is a cross-sectional view of the device of the present invention illustrating the relative parts of the device.

DETAILED DESCRIPTION OF THE DRAWING

Now referring to the drawing there is shown for illustrative purposes, a hand-operated device made in accordance with the teaching of the present invention. The device includes an elongated tubular member 10 which has a flat plate 11 connected to one end of the tube and an arbor 12 connected at the opposite end of the elongated tubular member. The plate 11 is provided with an aperture in axial alignment with the tubular member through which a control rod 13 having a threaded end 14 is passed. The control rod is passed through the elongated tubular member, such that the threaded end 14 extends through the arbor 12 into the hollow gripping handle 20 and the opposite end extends through and beyond the plate 11 connected to the tubular member 10. A bracket 15 is connected to the end of the control rod that extends beyond the tubular member and the free end of the bracket is formed into a ring 16 which is constructed in axial alignment with the control rod. A second bracket 17 is rigidly secured at one end to the plate 11 and has a tweezerlike element 18 secured to the outer end of the bracket 17. The tweezers are formed with tines 21 that have V-shaped ends 22 that pass through ring 16 and are secured together at the connection with the bracket to provide a normally open spring movement. The V-shaped ends of the tweezers are associated with the ring 16 such that movement of the ring toward the open ends of the tines will force the tines toward each other for closure thereof about an object 24 and movement of the ring toward the plate 11 away from the tines permits the tines to open into their normally open position releasing the object. A nut or thumbscrew 23 is positioned within the arbor on the outer end of the tubular member such that the thumbscrew is threaded onto the screwthreaded end of the control rod. Rotation of the thumbscrew will move the control rod axially relative to the cylindrical tubular member. Thus, the thumbscrew controls movement of the ring relative to the tines of the tweezer and therefore opening and closing of the tines.

In order to provide a vacuumtight device a bellows 31 is secured about the end of the control rod that extends beyond the tubular member and is welded, brazed, or soldered to plate 11 and to the fixed member 32 at the end of the control rod. A second bellows 33 is also secured about the tubular cylindrical member, being welded, brazed or soldered to the opposite side of the plate 11 and to a flange 35. The flange is provided with an aperture 34 through which the cylindrical member extends and which is enclosed by the bellows 33. The flange is secured to the wall 36 of a vacuum chamber. A metal vacuum seal 37 is provided between the flange and the vacuum chamber wall to prevent air leakage. The aperture within the flange is beveled in order to provide a fulcrum point for the cylindrical tubular member. Coil springs 41 are secured on opposite sides of the bellows 33 between the plate 11 and the flange 35 to prevent extreme extension of the bellows because of a difference between atmospheric pressure and the vacuum pressure within the chamber. The spring tension is adjusted to locate the tweezers at about the halfway point in their longitudinal travel range when the tubular member is not restrained by hand or is positioned in its free position. This minimizes the hand force pushing or pulling necessary to reach points at the extremes of the travel range.

Since it is sometimes necessary to elevate vacuum chambers to high temperatures to accomplish outgassing of adsorbed gases from the walls, it is preferred that the various parts be made of stainless steel. Thus, the handtool manipulator can be heated while outgassing the vacuum system, as well as during operation of the system if desired, without being damaged. The design also eliminates unnecessary interstices or pockets from which trapped gas would slowly leak into the chamber, forming a "virtual" leak.

For better control of the hand-operated device and for lateral movement relative to the axis, the portion of the tubular member extending on the outside of the chamber wall should be at least half the length of the tubular members from the fulcrum to the tool, such as the tweezers at the end thereof. Such an arrangement provides adequately precise control of the tool's angular position. If the handle on the outer end of the tubular member is too close to the fulcrum when the tool is at the limit of its extension into the chamber, small angular displacements of the handle will result in large lateral motion of the tool.

In operation, the device is secured to an opening within the vacuum chamber wall and the thumbscrew is rotated such that the control rod is moved outwardly through the arbor thereby moving the ring on the inner end thereof away from the open end of the tweezers thereby permitting normal opening of the tweezers. The handle is then moved to locate the tweezers at any desired position within the vacuum chamber. Once the tweezers have been moved to the desired object to be picked up, the handle is held stationary while the thumbscrew is rotated such that the control rod will be moved inward relative to the tubular member thereby closing the V-shaped ends of the tweezers, forcing the open end of the tweezers tightly against the object to be moved. Once the open end of the tweezers has been secured about the object to be moved the thumbscrew is left stationary while movement of the handle may be made for positioning the object at any desired place. Once the object has been moved to its desired place the thumbscrew may be rotated in the opposite direction from that in which the tweezer ends were closed, thereby releasing the object from the tweezers.

It is noted that the structure of the described handtool permits inward and outward directional movement of the tweezers as well as lateral movement in any direction. Thus, the device allows a large range of motion and versatility in application of the tool.

The device has been described as a structure for operating tweezers in a vacuum chamber. However, it will be obvious to those skilled in the art that the bracket to which the tweezers is mounted and the bracket to which the ring is mounted may be replaced by any other applicable mechanism, such as a wirecutter, cleaving mechanism, or any other device which may be operated within the mechanical range of the hand-operated device.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A handtool for performing work in an area on the opposite side of a wall structure from an operator; which comprises:

a flange,
an aperture within said flange,
a tubular member extending through said aperture within said flange,
a control rod coaxially assembled within said tubular member and extending beyond each end of said tubular member,
means for moving said control rod axially relative to said tubular member,
a plate means secured to the end of said tubular member on the end thereof opposite from said means for moving said control rod relative to said tubular member,
a work-tool means secured to said plate,
a tool manipulator secured to the end of said control rod extending beyond said plate means for manipulating said work tool by axial movement of said control rod relative to said tubular member,
a first metallic bellows secured between said plate means on the end of said tubular member and the end of said control rod extending beyond said plate means,
a second metallic bellows secured between said plate means and said flange on a line that circumscribes said aperture in said flange, and
spring means secured about said second metallic bellows between said plate means and said flange to prevent overextension of said second bellows,
whereby said work tool may be moved about within a work area without vacuum leakage due to the work tool.

2. A hand tool for remotely performing work within an evacuated chamber by an operator within an area under atmospheric pressure; which comprises:

an opening into said evacuated chamber,
a flange secured to close said opening against leakage,
an aperture within said flange,
an elongated tubular member extending into said evacuated chamber through said aperture in said flange,
a plate member secured to the end of said tubular member within said evacuated chamber,
an arbor secured to the end of said tubular member in said area under atmospheric pressure,
a control rod within said tubular member coaxial therewith and extending beyond each end of said tubular member,
said end of said control rod extending beyond said arbor having screw threads thereon,
a thumbscrew means secured within said arbor for movement of said control rod relative to said tubular member,
a metallic bellows secured between said plate member and the adjacent end of said control rod,
a second metallic bellows,
said second bellows secured between said plate member and said flange outwardly of the aperture within the flange,
a tweezer work tool secured to said plate member on the end of said tubular member,
control means secured to the end of said control rod for closing and opening said tweezer by use of said thumbscrew means, and
coil spring means secured outwardly of said second bellows and between said plate and said flange.

* * * * *